(12) United States Patent
Zheng et al.

(10) Patent No.: US 8,477,512 B2
(45) Date of Patent: Jul. 2, 2013

(54) ELECTRONIC DEVICE

(75) Inventors: Jun-Jie Zheng, Shenzhen (CN); Yan Zhong, Shenzhen (CN); Xin Ji, Shenzhen (CN); Wen-Hsiang Hung, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 339 days.

(21) Appl. No.: 12/777,413

(22) Filed: May 11, 2010

(65) Prior Publication Data

US 2011/0194266 A1 Aug. 11, 2011

(30) Foreign Application Priority Data

Feb. 6, 2010 (CN) .......................... 2010 1 0301294

(51) Int. Cl.
*H05K 1/11* (2006.01)
(52) U.S. Cl.
USPC ........... 361/784; 361/790; 361/807; 361/810; 361/748; 361/785; 439/329

(58) Field of Classification Search
USPC .............. 361/790, 807, 810, 679.32, 679.39, 361/784, 823, 829, 748, 785; 439/329
See application file for complete search history.

(56) References Cited

U.S. PATENT DOCUMENTS

| | | | | |
|---|---|---|---|---|
| 6,535,397 | B2* | 3/2003 | Clark et al. | 361/788 |
| 2002/0090844 | A1* | 7/2002 | Kocin | 439/74 |
| 2006/0046524 | A1* | 3/2006 | Chen | 439/65 |
| 2010/0136847 | A1* | 6/2010 | Hung et al. | 439/701 |

* cited by examiner

*Primary Examiner* — Jayprakash N Gandhi
*Assistant Examiner* — Hung Dang
(74) *Attorney, Agent, or Firm* — Altis Law Group, Inc.

(57) ABSTRACT

An electronic device includes a main frame structure, a plurality of functional modules fixed to the main frame structure, a plurality of cables connecting the functional modules, a cable collector board fixed to the main frame structure, and a motherboard detachably connected to the main frame structure. The cable collector board includes a plurality of first printed circuits electrically collecting the cables, and a first connector electrically collecting the first printed circuits. The motherboard includes a plurality of second printed circuits and a second connector collecting the second printed circuits. The second connector is detachably electrically connected to the first connector.

10 Claims, 3 Drawing Sheets

ELECTRONIC DEVICE

BACKGROUND

1. Technical Field

The present disclosure relates in general to electronic devices, particularly, to an electronic device having a motherboard.

2. Description of Related Art

A conventional computer, such as a desktop computer or a notebook computer, usually includes at least a "barebone" system. The barebone system includes a housing and a motherboard received in the housing. Other functional modules, such as a power supply, a display device, a hard disk, and a CD-ROM, are electrically connected to the motherboard via a plurality of cables. When replacing the modules, the cables are detached from the modules, and the modules are taken out of the housing.

However, if a user wants to replace the motherboard, it is usually unduly time-consuming and laborious because all of the cables connected to the motherboard should be unplugged and reconnected during the replacement.

Therefore, an electronic device which overcomes the described limitations is desired.

BRIEF DESCRIPTION OF THE DRAWINGS

The components in the drawings are not necessarily drawn to scale, the emphasis instead being placed upon clearly illustrating the principles of the present disclosure.

Moreover, in the drawings, like reference numerals designate corresponding parts throughout the views.

DETAILED DESCRIPTION

Figure 1:
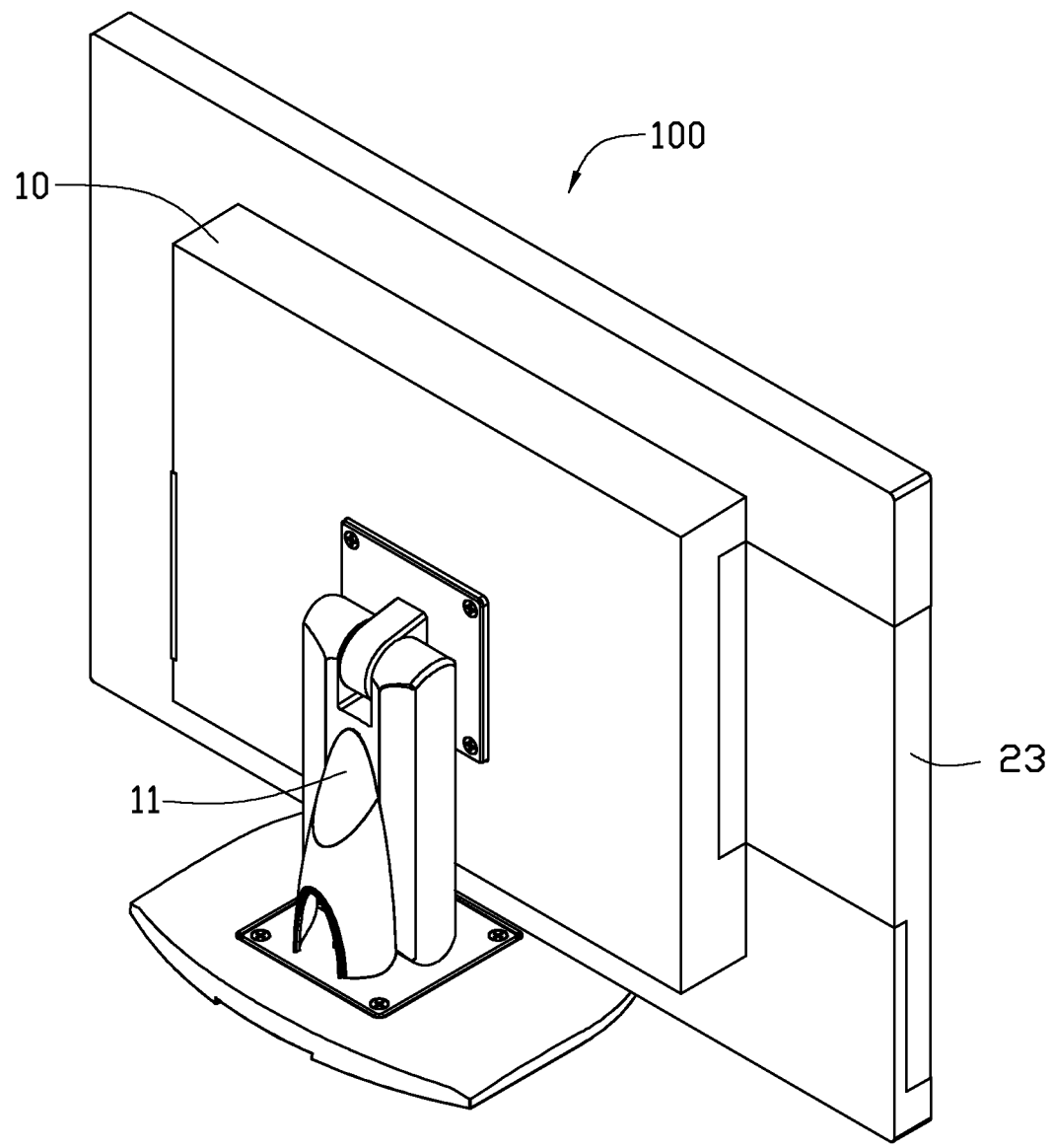
FIG. 1 is an isometric view of an embodiment of an electronic device, the electronic device includes a barebone system.

Referring to FIG. 1, an embodiment of an electronic device 100 includes a barebone system 10, and a supporting mechanism 20 supporting the barebone system 10. In the illustrated embodiment, the barebone system 10 is an all-in-one computer.

Figure 2:
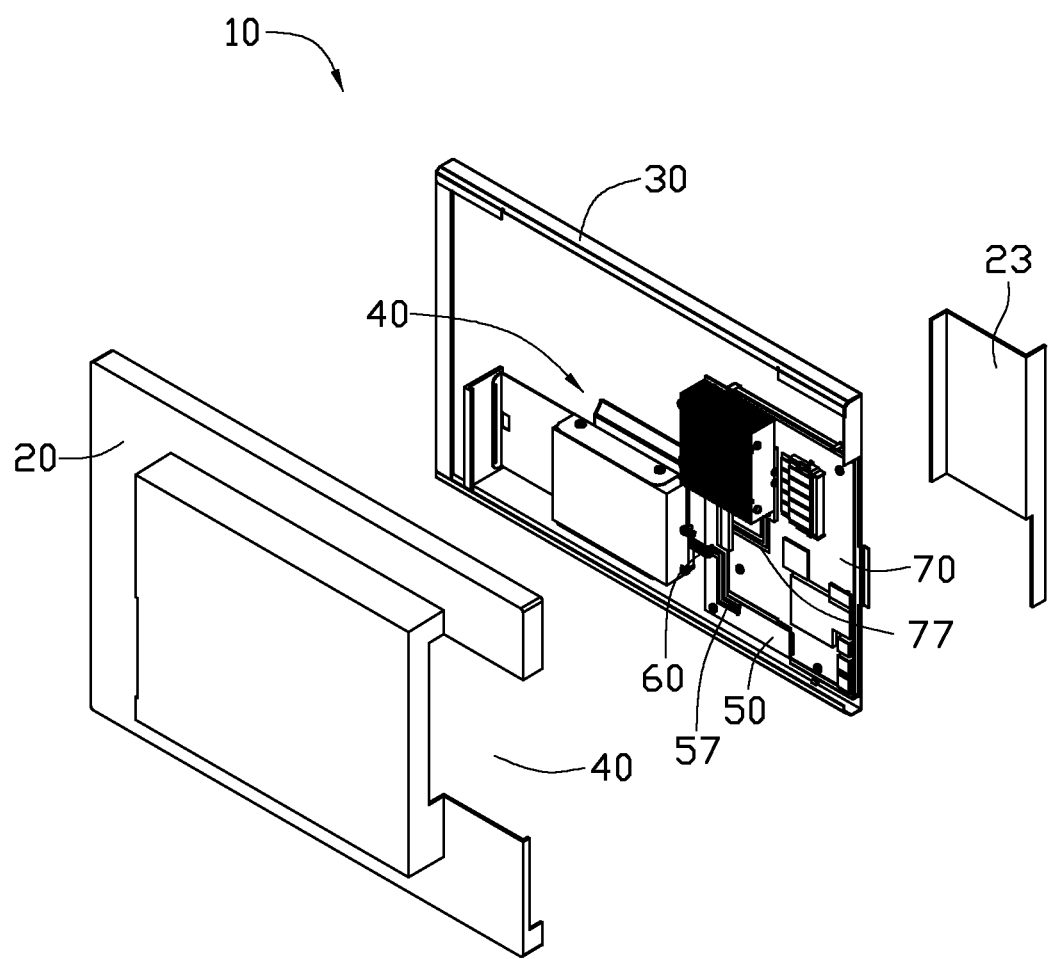
FIG. 2 is an exploded, isometric view of the barebone system of FIG. 1.

Referring to FIG. 2, the barebone system 10 includes a housing 20, and a main frame structure 30, a plurality of functional modules 40, a cable collector board 50, a plurality of cables 60, and a motherboard 70 received in the housing 20.

The main frame structure 30 is substantially a flat plate. The plurality of functional modules 40 and the cable collector board 50 are fixed to the main frame structure 30 via some fastener structures (not labeled). The housing 20 defines an opening 21 corresponding to the motherboard 70. The motherboard 70 is detachably connected to the main frame structure 30, and can be taken out from the barebone system 10 via the opening 21. The housing 20 includes a cover 23 to seal the opening 21.

Figure 3:
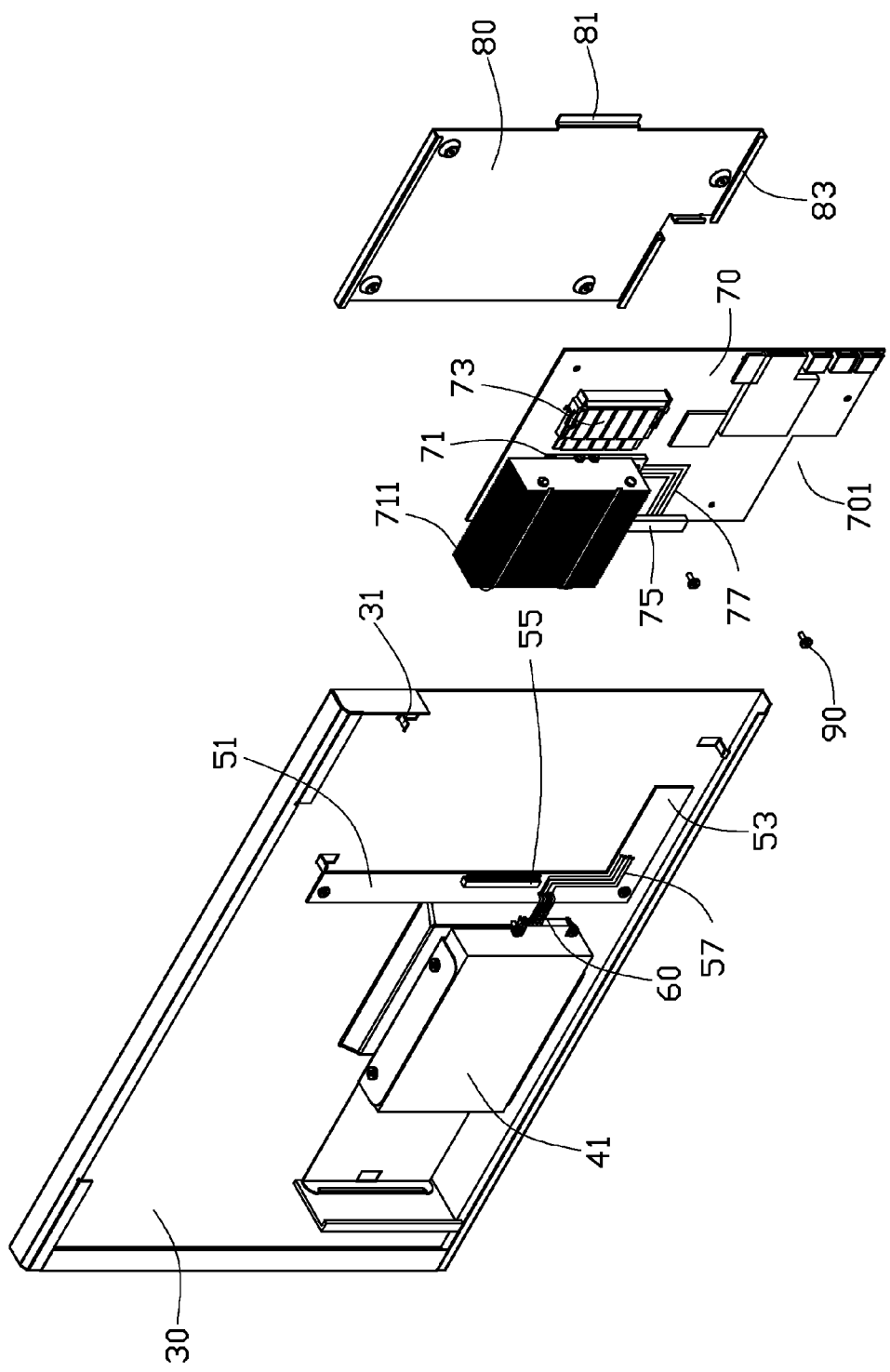
FIG. 3 is another exploded, partial, isometric view of the barebone system of FIG. 2.

Referring to FIG. 3, the plurality of functional modules 40 includes a hard disk 41 and a display device 43. The hard disk 41 is located at one side of the main frame structure 30 adjacent to the cable collector board 50, and the display device 43 is located at the other side of the main frame structure 30. The hard disk 41 and the display device 43 are electrically connected to the cable collector board 50 via the plurality of cables 60. The functional modules 40 may include other electronic components, such as a power supply, a CD-ROM, or a peripheral interface module.

The cable collector board 50 is substantially an L-shaped board, and is fixed to the main frame structure 30 via two fasteners (not labeled). The cable collector board 50 includes a main body 51 and a positioning portion 53 extending substantially perpendicular to an end of the main body 51. The cable collector board 50 further includes a plurality of first printed circuits 57 embedded in the main body 51, and a first connector 55 positioned on the main body 51 and facing the opening 21. The plurality of first printed circuits 57 are defined as a combination of wires or circuitries configured to achieve a certain type of function of each of the functional modules 40. The plurality of first printed circuits 57 are collected to the first connector 55. In the illustrated embodiment, the first connector 55 is a bus connector having a plurality of gold fingers (not labeled).

The motherboard 70 includes a plurality of second printed circuits 77 embedded in the motherboard 70, and a second connector 75 positioned on a marginal portion of the motherboard 70 away from the opening 21. The electronic device 100 further includes a central processing unit (CPU) 71 positioned on one side of the motherboard 70, a heat sink 711 fixed to the CPU 71, and a memory 73 positioned on the front side of the motherboard 70 near the heat sink 711. The CPU 71 and the memory 73 are electrically connected to the second printed circuits 77. The second printed circuits 77 are connected to the second connector 75. In the illustrated embodiment, the second connector 75 is a bus connector having a slot (not labeled) to receive the gold fingers of the first connector 55. The motherboard 70 defines a notch 701 near a bottom portion thereof to receive the positioning portion 53 of the cable collector board 50, such that the first connector 55 and the second connector 75 can be precisely engaged.

The electronic device 100 further includes a supporting board 80 having substantially the same shape as the motherboard 70. The motherboard 70 is fixed to the supporting board 80 by a plurality of fasteners 90. The supporting board 80 includes a handle portion 81 extending from a marginal portion of the supporting board 80 facing the opening 21. The supporting board 80 further includes a plurality of hooks 83 formed by bending an upper and a bottom portion of the supporting board 80 to latch an upper edge portion and a bottom edge portion of the motherboard 70, to improve the stability of the motherboard 70.

The main frame structure 30 further includes a plurality of latch portions 31 formed on the side of the main frame structure 30. The supporting board 80 is slidably located between the plurality of latch portions 31. In the illustrated embodiment, the plurality of latch portions 31 are extended substantially perpendicular to the side of the main frame structure 30 facing the motherboard 70.

In assembly, the motherboard 70, as well as the supporting board 80, are received in the housing 20 by passing through the opening 21. The second connector 75 is electrically connected to the first connector 55, such that the plurality of functional modules 40 are electrically connected to the CPU 71 and the memory 73 of the motherboard 70 via the cable collector board 50.

When replacing the motherboard 70, the cover 23 is dismounted from the housing 20. The supporting board 80 slides along the plurality of latch portions 31 by pulling the handle portion 81, such that the second connector 75 is detached from the first connector 55, and the motherboard 70 is taken out of the housing 20 through the opening 21.

In the electronic device 100, the plurality of functional modules 40 are electrically connected to the motherboard 70 via the cable collector board 50, such that the plurality of cables 60 is not attached to the motherboard 70 directly. Thus, it is not necessary to perform the unduly time-consuming and laborious plugging or inserting of the cables 60 during the replacement of the motherboard 70 or other electronic components fixed on the motherboard 70.

In alternative embodiments, the plurality of latch portions 31, the supporting board 80, the positioning portion 53, and the notch 701 may be omitted. The opening 21 and the cover 23 may be omitted, as long as the housing 20 can be easily detached from the main frame structure 30.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
    a main frame structure;
    a plurality of functional modules fixed to the main frame structure;
    a plurality of cables connecting the functional modules;
    a cable collector board fixed to the main frame structure, the cable collector board comprising a plurality of first printed circuits electrically collecting the cables, and a first connector electrically collecting the first printed circuits;
    a motherboard detachably connected to the main frame structure; the motherboard comprising a plurality of second printed circuits and a second connector collecting the second printed circuits; and
    a supporting board slidably connected to the main frame structure, and the motherboard being fixed to the supporting board,
    wherein the second connector is detachably electrically connected to the first connector.

2. The electronic device of claim 1, wherein the first and the second connectors are both bus connectors.

3. The electronic device of claim 1, wherein the plurality of functional modules comprises a display device fixed to the main frame structure.

4. The electronic device of claim 3, wherein the main frame structure is shaped as a flat plate; the display device and the cable collector board are located on opposite sides of the main frame structure.

5. The electronic device of claim 1, further comprises a housing to receive the main frame structure, the housing defines an opening corresponding to the motherboard.

6. The electronic device of claim 5, wherein the first connector is positioned on the cable collector board facing the opening; the second connector is positioned on the motherboard away from the opening.

7. The electronic device of claim 1, wherein the cable collector board further comprises a positioning portion extending outwards from an end thereof; the motherboard defines a notch to receive the positioning portion.

8. The electronic device of claim 1, wherein the supporting board comprises a handle portion formed at a marginal portion thereof.

9. The electronic device of claim 1, wherein the main frame structure forms a plurality of latch portions, the supporting board is slidably located between the plurality of latch portions.

10. The electronic device of claim 1, wherein the supporting board further includes a plurality of hooks to latch a plurality of edge portions of the motherboard.

* * * * *